United States Patent [19]

Knauss

[11] Patent Number: 4,599,993
[45] Date of Patent: Jul. 15, 1986

[54] TEMPERATURE SENSOR

[75] Inventor: Hermann Knauss, Oberderdingen, Fed. Rep. of Germany

[73] Assignee: E.G.O. Elektro-Gerate Blanc u. Fischer, Fed. Rep. of Germany

[21] Appl. No.: 656,940

[22] Filed: Oct. 2, 1984

[30] Foreign Application Priority Data

Oct. 19, 1983 [DE] Fed. Rep. of Germany ....... 3337900

[51] Int. Cl.⁴ ............................................. A47J 27/00
[52] U.S. Cl. ..................................... 126/374; 236/32; 60/530
[58] Field of Search ............. 60/530; 236/93 A, 99 R, 236/21 R, 21 B, 32; 126/374

[56] References Cited

U.S. PATENT DOCUMENTS 1,326,957 1/1920 Norwood .

Primary Examiner—Allen M. Ostrager
Attorney, Agent, or Firm—Steele, Gould & Fried

[57] ABSTRACT

A hydraulic expansion temperature sensor is provided with such a large surface, by a spiral, meander-like or similar coiling of its sensing tube, that it has an extremely fast reaction time. The sensing tube forms a structural unit with a flat support, which on the one hand shields the sensing tube and on the other tightly seals the opening necessary for fitting the temperature sensor in a container wall.

17 Claims, 3 Drawing Figures

TEMPERATURE SENSOR

BACKGROUND OF THE INVENTION

The invention relates to a temperature sensor, which is filled with expansion fluid, is connected via a capillary tube, with an expansion member of a regulator, and is adapted for mounting in a fluid container; particularly in a container wall of, for example, a deep fat fryer. Hydraulic sensors are generally better suited for measuring fluid or liquid temperatures, particularly those above 100° C., than electrical or electronic temperature sensors, due to the lower technical expenditure. It is known, for example, to use a straight sensing or sensor tube for measuring fluid temperature, which can also be encased and said tube is allowed to project directly into the liquid. In another known arrangement, the sensing tube is replaced by a box or cell which projects into the liquid. In both cases, it is a disadvantage of the known sensors that their reaction or response time (thermal inertia) is relatively long with respect to the temperature ranges of the medium to be measured. Particularly where powerful heat sources are used for heating the medium, serious difficulties can be caused by this inertia of, for example, 1 to 2 minutes, e.g. the overheating of fat in the deep fat fryer, which is the equivalent of making the medium to be heated unusable. It is therefore necessary in the known constructions to keep the heating capacity correspondingly low, which leads to increased inertia (slower response) of the complete controlled system, which is uneconomical.

SUMMARY OF THE INVENTION

The object of the invention is to so construct a temperature sensor of the aforementioned type that, together with simple construction and easy mounting, the response or reaction time is reduced.

According to the invention, this object is achieved by a temperature sensor of the aforementioned type, comprising a standard unit formed from a substantially flat support with a sensor or sensing tube fitted approximately parallel to its surface in a multiple wound arrangement. This makes it possible to increase considerably or to virtually any desired extent, the effective surface of the sensing tube, which leads to a corresponding reduction in the control inertia. It has been found, for example, that with a sensing tube length of somewhat more than 1 m and with a coiled arrangement of said tube in an area with a diameter of approximately 65 mm, the reaction time of the regulator is between 5 and 10 seconds in a liquid fat medium. This is equivalent to the reaction time of an electronic sensor, but in this case the technical expenditure has been considerably reduced and there is a decrease to the susceptibility to faults. It is also possible to make the sensing tube even longer and/or to coil it so tightly that it can be positioned on a panel or area with an even smaller surface.

The temperature sensor fitting is greatly simplified if the support is constructed as a container wall cover with a mounting flange, which preferably surrounds the complete circumference of the sensing tube area.

Thus, the temperture sensor can, as a cover, be easily introduced in a corresponding opening in the associated container wall and can be sealingly joined thereto.

In order to protectively house a sensing tube by simple construction, it is advantageous if the tube is arranged in a flush sensing tube area or panel at right angles to the support plane. Preferably the entire periphery of the area or panel passes via a step into a support edge, which is essentially in a plane parallel to the sensing tube area. This step also shields the sensing tube against damage from the periphery. This is particularly the case if the sensing tube is completely set back with respect to the support edge plane and is preferably spaced only somewhat from a surrounding step, that is tightly, but with limited spacing.

It is also possible to construct the sensing tube as an integrated unit, e.g. one-piece of the monolithic component with the support. Nevertheless, it is particularly simple to manufacture and install if the sensing tube is constructed as a component separated from the support and the tube is arranged on a surface of the support, particularly as to substantially cover the entire sensing tube area.

According to another feature of the invention, the sensing tube is arranged in the container so said fluid flows round it. The sensing tube is fixed to the inside of the support over approximately it entire length and spaced from the support, preferably by the interposing of at least one, substantially only zonally engaging spacer.

The fluid rising as a result of heating is whirled and consequently thoroughly mixed by the sensing tube, particularly if the latter or the support are located in a vertical plane, which improves the precision of the temperature sensing and control to an even greater extent. In this case, the sensing tube ends are appropriately sealingly guided through openings on the outside of the support, so that they are not subject to the action of the fluids.

In yet a further embodiment, the sensing tube engages flatly with the outside of the support. The support is made from highly thermally conductive material and the sensing tube is preferably fixed thereto over its entire length, e.g. by soldering. In this case, the very thin-walled part of the support forming the sensing tube area or panel acts as a temperature membrane or diaphragm, which in turn is directly exposed to the fluid and heat resulting from the fluid action is passed by it by the shortest way to the sensing tube. The soldering, which can be carried out in the form of pick-up or braze welding, and in which the sensing tube is thereby at least partly embedded, leads to high heat transmission cross-sections (a low heat transmission resistance), so that here again an adequately fast reaction time for many applications can be achieved.

It has also proved advantageous to arrange adjacent turns of the sensing tube at a distance from one another of approximately 1 to 2 times the sensing tube diameter and the distance between the tube and the support approximately corresponds thereto. However, each of these features individually lean on the one hand to a good flow around the sensing tube and on the other to an optimum compact coiled arrangement, so that only a relatively small sensing tube are is required for a considerable sensing tube length. However, it is also possible to even more tightly arrange the sensing tube turns.

According to a particularly advantageous embodiment, the sensing tube area, and in particular the complete support, is defined in a round and preferably circular manner, which minimizes the surface of the sensing tube area. However, the sensing tube area can also have other geometrical shapes, e.g. rectangular, square, triangular, oval or the like. Particularly in the case of the circular construction of the sensing tube area it is advantageous for the sensing tube to be wound or coiled in such a way that its periphery at least approximately coincides with a circular shape. Independently of the geometrical shape of the periphery, it is appropriate to provide the sensing tube in a central spiral arrangement, because then the maximum radii of curvature of the turns can be provided in proportion to the size of the sensing tube area and there is a minimum bending stressing of the sensing tube. It is admittedly known (German Offenlegungsschrift Nos. 1,565,528 and 1,565,529) to provide a spirally wound sensing tube on the bottom of a hotplate for the purpose of regulating the temperature thereof, but this sensing tube is only partly in direct contact with the material to be measured, namely the hotplate body. The temperature measurement of this solid material causes quite different problems than the temperature measurement of a circulatable fluid according to the invention.

A particularly flat construction of the temperature sensor is obtained if all its turns are located in a single plane. In this case, it is possible for the spacer to be constructed in simple manner as a cross-bar or the like, which can for example be formed from pipe sections made from the same pipe as the sensing tube. Such a spacer ensures the sensing tube will be held in position by essentially point contacts (punctiform) with the spacer.

BRIEF DESCRIPTION OF THE DRAWINGS

The invention is described in greater detail hereinafter relative to non-limiting embodiments and the attached drawings, wherein.

DETAILED DESCRIPTION OF THE PREFERRED EMBODIMENTS

Figure 1:
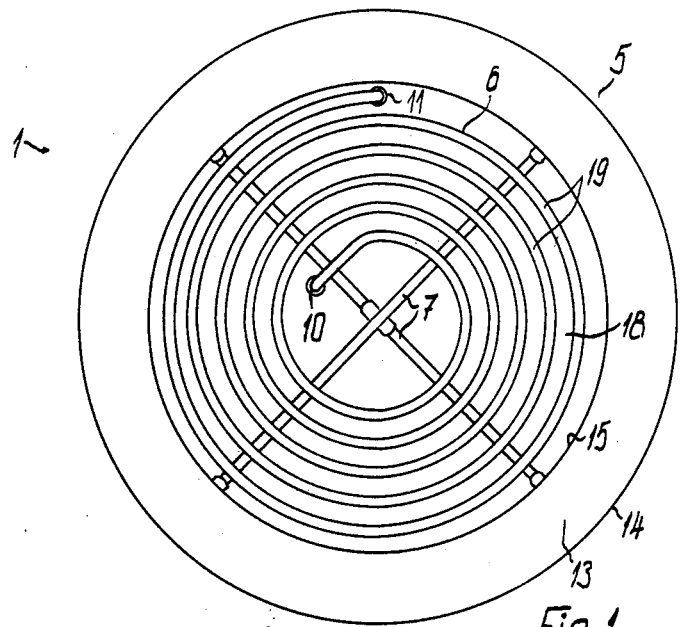
FIG. 1 is a view of the inside of the temperature sensor according to the invention.
Figure 2:
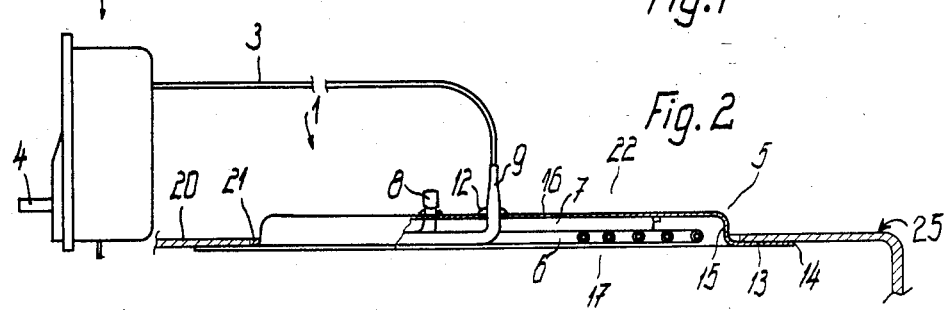
FIG. 2 is a part-sectional plan view of the temperature sensor according to FIG. 1.

As shown in FIGS. 1 and 2, a temperature sensor according to the invention comprises a standard unit to be fitted at the measuring point and a regulator 2 connected therewith via a capillary tube 3. The regulator 2 is fitted, for example, at an appropriate point of an instrument panel. Regulator 2 may have an expansion cell or box (not shown) connected to the associated end of the capillary tube 3. The expansion is electrically tapped and used for regulating a heat source acting on the medium to be measured. It is possible to set the desired heating temperature by means of a regulator shaft 4.

The standard unit 1 comprises a flat and almost planar support 5 for installing the standard unit 1. A sensing tube 6 is fixed to said support 5 and is arranged thereon by a spacer 7. The ends 8, 9 of the tube are guided through the openings 10, 11 on the side of support 5 remote from the main portion of sensing tube 6 and sealed in said openings 10, 11 e.g. by solder 12. The planar support is therefore substantially imperforate, the few openings, if any, being sealed during construction. One end of 8 sensing tube 6 is, for example, closed by squeezing. The other, tapered end 9 is connected to the end of the capillary tube 3 remote from regulator 2, so that a hermetically sealed system for receiving the expansion fluid is formed.

The circular support according to FIG. 1 has an annular mounting flange 13, which forms the outermost support edge 14. Within the mounting flange 13 there is a flat dish-like central area of support 5, which is countersunk to one side, produced for example by deep drawing, and is fixed in one piece to the mounting flange 13, produced for example of sheet metal, and passes in cross-section via a jacket-like step 15 into the mounting flange 13. The flat, circular disk-shaped base wall 16 of the countersunk or flush central portion running parallel to the plane of mounting flange 13 forms, on the inside 17 of support 5, a sensing tube panel or area 18, which is essentially uniformly covered by the sensing tube 6. Spacer 7, in the form of a rectangular cross bar, is fixed directly to the inside of the base wall 16 and the ends thereof run approximately up to the step 15. Sensing tube 6 is arranged on the spacer at a distance from base wall 16 corresponding to the cross-sectional height of said spacer 7. Tube 6 may be connected, for example, at each crossing point with spacer 7 by soldering or the like, which leads to a very high mechanical strength of sensing tube 6, despite its considerable length. Sensing tube 6 is spirally wound in a plane parallel to the plane of base wall 16, in such a way that its inner end is the closed end 8 and it outer end the end 9 connected to capillary tube 3. The distance between adjacent turns 19 is approximately 1 to 2 times the diameter of sensing tube 6 and the outermost turn 19 is very close to step 16.

FIG. 2 shows an upright or vertical container wall 20 of the container or vessel 25, to which component 1 is to be fixed. For installation purposes, wall 20 can have an opening 21, which is only slightly larger than the external diameter of step 15. Component 1 is inserted in said opening from the inside of wall 20, in such a way that the mounting flange 13 tightly engages with its whole area against the inner surface or inside of wall 20 and can be fixed with appropriate means. Where the outside 22 of component 1 is formed by the flush central area, it projects over the outside of container wall 20, while sensing tube 6 is located approximately in the plane of wall 20 and the fluid provided in the associated container 25 flows around it.

Figure 3:
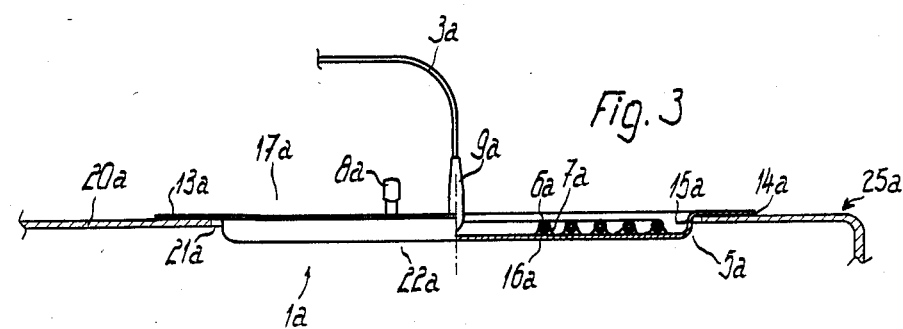
FIG. 3 is another embodiment of a temperature sensor in a view according to FIG. 2.

In FIG. 3, the same reference numerals as in FIGS. 1 and 2 are used for corresponding parts, but the letter "a" is added. As shown in FIG. 3, the sensing tube 6a directly engages with the inside of base wall 16a and is fixed thereto over its entire longitudinal extension in continuous manner, e.g. by soldering 7a. Thus, in this case, the distance between the planes of base wall 16a and mounting flange 13a can be made even smaller. Component 1 is fitted from the outside of container wall 20a, so that the outside of base wall 16a projects into the interior of the container and the mounting flange 13a is engagingly fixed with the outside of the container wall 20a. Ends 8a, 9a of sensing tube 6a are bent away from the base wall 16a, so that they do not pass through support 5a. In the embodiment according to FIG. 3, the support is completely imperforate and the fluid consequently does not flow around sensing tube 6a. Instead, the fluid is subjected to the action of the heat of the fluid through the base wall 16a, because outside 17a of component 1a is formed by the depression receiving the sensing tube 6a.

What is claimed is:

1. A temperature sensor, which is filled with an expansion fluid and connected via a capillary tube to an expansion member of a regulator, for installation in a fluid container, the sensor comprising a standard component formed from a substantially flat support having a surface defining a sensing tube area and a sensing tube running approximately parallel to the surface in a multiply wound arrangement, the sensing tube being fixed to the inside of the support, yet spaced from the support surface over approximately its entire length to enable and constrain heated fluid in the container to flow around the sensing tube and back into the container, whereby a temperature control system with very low thermal inertia is provided and the sensing tube is protected from damage.

2. A temperature sensor according to claim 1, wherein the sensor is constructed as a cover for an opening in a wall of the container, the support further comprising a peripheral mounting flange which surrounds the entire circumference of the sensing tube area.

3. A temperature sensor according to claim 1, wherein the sensing tube is arranged in a flush protion of the sensing tube area at right angles to the support plane, which area passes via a step into a support edge, which edge is substantially located in a plane approximately parallel to the sensing tube area.

4. A temperature sensor according to claim 3, wherein the sensing tube is completely set back with respect to the support edge plane and is closely spaced from the step.

5. A temperature sensor according to claim 3, wherein the sensing tube is constructed as a component separate from the support and is arranged on one surface of the support, substantially overlying the entire sensing tube area.

6. A temperature sensor according to claim 1, wherein an intermediate piece is arranged between the sensing tube and the support.

7. A temperature sensor according to claim 1, wherein the ends of the sensing tubes are sealingly passed through openings of the outside of the support.

8. A temperature sensor according to claim 1, wherein adjacent turns of the sensing tube are spaced from one another by approximately 1 to 2 times the sensing tube diameter.

9. A temperature sensor according to claim 1, wherein the support is defined in a circular manner and the sensing tube is wound in an approximately circular arrangement.

10. A temperature sensor according to claim 1, wherein all the turns of the sensing tube are located in one plane and the spacer comprises a cross bar.

11. A temperature sensor according to claim 1, wherein the sensor is adapted for fitting in a container wall.

12. A temperature sensor according to claim 11, wherein the container is a deep fat frier.

13. A temperature sensor according to claim 1, wherein the sensing tube and the support are fixed by soldering.

14. A temperature sensor according to claim 1, wherein the sensing tube and the support are spaced by a distance approximately corresponding to 1 to 2 times the sensing tube diameter.

15. A temperature sensor according to claim 8, wherein the sensing tube and the support are spaced by a distance approximately corresponding to 1 to 2 times the sensing tube diameter.

16. A temperature sensor according to claim 9, wherein the sensing tube is wound in a spiral arrangement.

17. A temperature sensor according to claim 10, wherein the spacer comprises pipe sections.

* * * * *